United States Patent [19]

Ohta et al.

[11] Patent Number: 4,902,951
[45] Date of Patent: Feb. 20, 1990

[54] NUMERICALLY CONTROLLED MACHINE TOOL

[75] Inventors: Norio Ohta, Okazaki; Yoshinobu Yotsui; Kouichi Isomura, both of Kariya; Masatomo Yoshimura, Toyoake, all of Japan

[73] Assignee: Toyoda-Koki Kabushiki-Kaisha, Kariya, Japan

[21] Appl. No.: 236,549

[22] Filed: Aug. 25, 1988

[30] Foreign Application Priority Data

Aug. 25, 1987 [JP] Japan .................. 62-211664

[51] Int. Cl.$^4$ ............................................ G06F 11/00
[52] U.S. Cl. ........................... 318/632; 318/571; 318/568.1; 364/474.06; 364/474.35
[58] Field of Search ................ 318/564–576, 318/632; 364/474.05, 474.06, 474.28, 474.29, 474.33, 474.34, 474.35

[56] References Cited

U.S. PATENT DOCUMENTS

| | | | |
|---|---|---|---|
| 3,344,559 | 10/1967 | Inaba et al. | |
| 3,482,357 | 12/1969 | Inaba et al. | |
| 3,725,654 | 4/1973 | Tripp | 318/632 X |
| 3,798,430 | 3/1974 | Simon et al. | |
| 3,917,930 | 11/1975 | Davey et al. | |
| 4,099,113 | 7/1978 | Hayashi | |
| 4,206,393 | 6/1980 | Chiba | |
| 4,341,986 | 7/1982 | Browder | |
| 4,400,781 | 8/1983 | Hotta et al. | 364/474.06 |
| 4,484,413 | 11/1984 | Yomamoto et al. | 364/474.06 X |
| 4,502,125 | 2/1985 | Yoneda et al. | 364/474.06 X |
| 4,514,813 | 4/1985 | Nozawa et al. | 364/474.35 |
| 4,533,991 | 8/1985 | Georgis | |
| 4,731,607 | 3/1988 | Yoneda et al. | 364/474.06 |
| 4,815,000 | 3/1989 | Yoneda et al. | 318/571 X |

FOREIGN PATENT DOCUMENTS

| | | |
|---|---|---|
| 52-133198 | 11/1977 | Japan . |
| 52-144895 | 12/1977 | Japan . |
| 59-194206 | 11/1984 | Japan . |
| 59-194207 | 11/1984 | Japan . |
| 2079003 | 1/1982 | United Kingdom ............ 318/568.1 |

Primary Examiner—William M. Shoop, Jr.
Assistant Examiner—Paul Ip
Attorney, Agent, or Firm—Oblon, Spivak, McClelland, Maier & Neustadt

[57] ABSTRACT

A numerically controlled machine tool for machining a non-circular workpiece according to profile data. The numerical controller stores phase compensation values and position compensation data files in connection with the types of cam and the various rotational speeds of the main spindle. Each position compensation data file consists of a series of position compensation values for a successive rotational positions of the main spindle. The numerical controller searches a phase compensation value and a position compensation data file according to the type of cam to be ground and the rotational speed of the main spindle during the grinding operation. Thereafter, the numerical controller offsets the read-out position of the profile data by the amount corresponding to the searched phase compensation value, and compensates each profile data with position compensation data stored in the searched file so as to eliminate a machining error which changes depending upon the rotational speed of the main spindle.

5 Claims, 11 Drawing Sheets

| COMPENSATION VALUE TABLE | 3271 |
|---|---|
| COMPENSATION DATA FILE P1 | |
| COMPENSATION DATA FILE P2 | |
| COMPENSATION DATA FILE P3 | |
| ⋮ | 3272 |

| θ1 | ΔX1 |
|---|---|
| θ2 | ΔX2 |
| θ3 | ΔX3 |
| θ4 | ΔX4 |
| θ5 | ΔX5 |
| ⋮ | ⋮ |

| PROFILE DATA NO. | ROTATIONAL SPEED OF MAIN SPINDLE | PHASE COMPENSATION VALUE $\Delta\theta$ | X AXIS (POSITION) COMPENSATION DATA FILE NO. |
|---|---|---|---|
| P1234 | 10 rpm | $\Delta\theta_1$ | P1 |
| | 20 | $\Delta\theta_2$ | P2 |
| | 30 | $\Delta\theta_3$ | P3 |
| P1235 | 10 | $\Delta\theta_4$ | P4 |
| | 20 | $\Delta\theta_5$ | P5 |
| | 30 | $\Delta\theta_6$ | P6 |
| ⋮ | ⋮ | ⋮ | ⋮ |

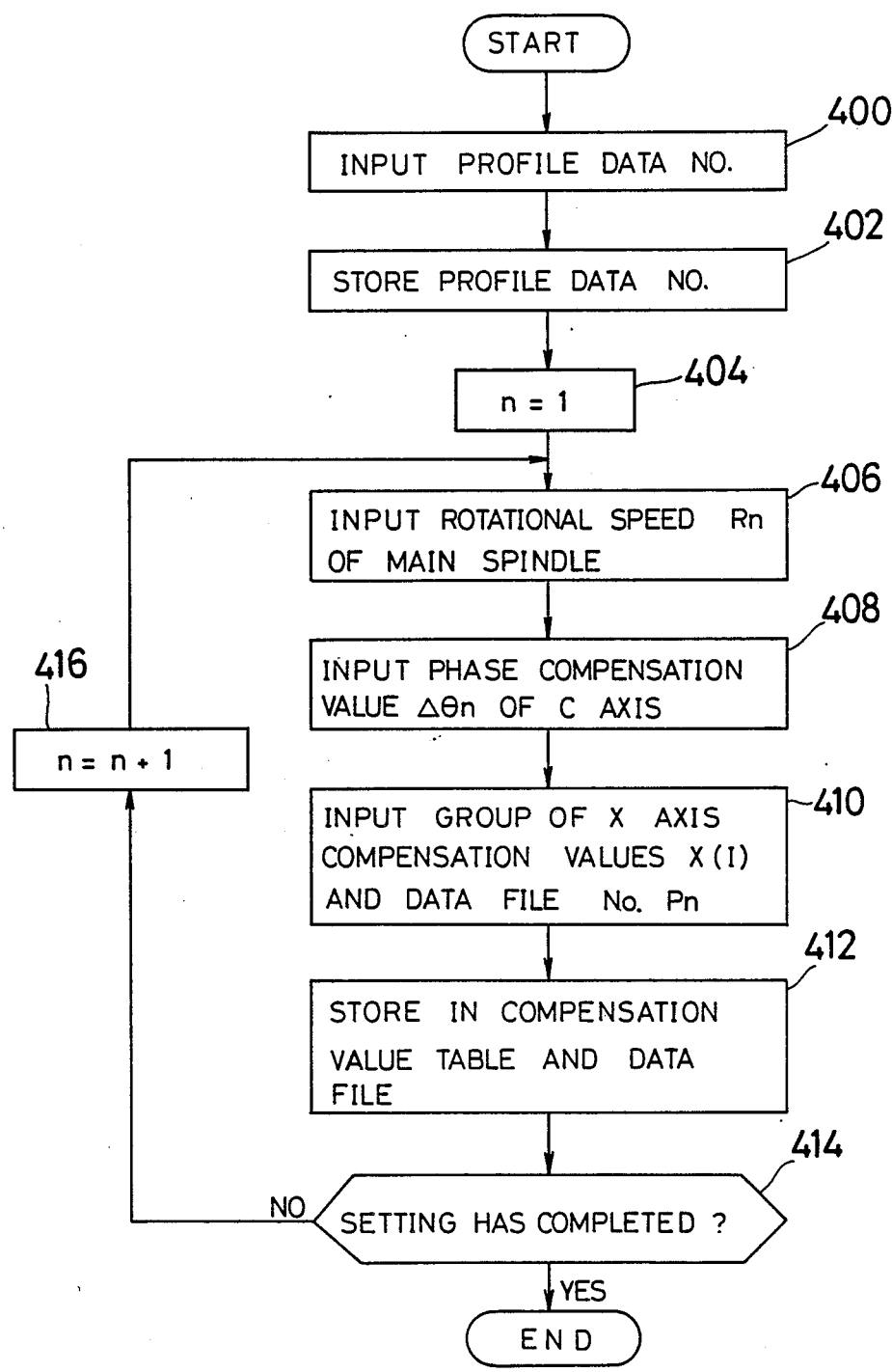

```
       ┊       ┊
NO10   G51  P1234
NO20   G01  X-0.1  F0.1  R0.1  S20
NO30   G04  P2  S10
       ┊       ┊
```

NUMERICALLY CONTROLLED MACHINE TOOL

BACKGROUND OF THE INVENTION

1. Field of the Invention:

The present invention relates to a numerically controlled machine tool capable of machining a noncircular workpiece such as a cam shaft.

2. Description of the Prior Art:

Generally, in a numerically controlled grinding machine for grinding a non-circular workpiece, the feed of the grinding wheel perpendicular to a spindle axis is controlled according to profile data and machining cycle data.

The profile data comprises the amount of movement of the grinding wheel per unit angle rotation of the spindle which defines the profile generating movement of the grinding wheel along the finished shape of the workpiece. On the other hand, the machining cycle data comprises a numerical control program to control a machining cycle which includes rapid feed, rut-in feed and retracting feed of the grinding wheel.

In the numerically controlled grinding machine tool of the aforementioned type, the ability of the main spindle and the grinding wheel feed axis to accurately follow command data are needed so as to grind the workpiece precisely.

In order to improve machining accuracy, the assignee of this invention has proposed a method, which is disclosed in U.S. Patent Application Ser. No. 07/092,689, filed Sep. 3, 1987, now pending. In this method, a machine tool is operated according to ideal profile data which is calculated from the ideal final shape of a workpiece. During operation, the positional changes of the tool and the main spindle are measured in order to obtain actual movement data. After that, position compensation data is calculated by comparing the ideal profile data and the measured movement data, and the ideal profile data is compensated for with the position compensation data in order to obtain execution profile data, which is used in the actual machining operation.

In such method, however, the position compensation data is set at a constant value regardless of the change in the rotational speed of the main spindle. Accordingly, machining errors arise, even if the compensated execution data is used for the actual machining operation.

Namely, when a workpiece is machined without the above-mentioned compensation, a machining error which changes depending upon the rotational speed of the main spindle arises as shown in FIG. 1. Accordingly, the machining error cannot be eliminated with the constant position compensation data in the case that the rotational speed of the main spindle changes during machining operation.

SUMMARY OF THE INVENTION

Accordingly, it is a primary object of the present invention to provide an improved numerically controlled machine tool capable of increasing machining accuracy.

Another object of the present invention is to provide an improved numerically controlled machine tool capable of maintaining high machining accuracy irrespective of the change in the rotational speed of the main spindle.

Briefly, according to the present invention, there is provided a numerically controlled machine tool for machining a non-circular shaped workpiece such as a cam. The numerically controlled machine tool has profile data memory means for storing profile data which are calculated from an ideal final shape of the workpiece and compensation data memory means for storing plural groups of compensation data, which are used for compensating for follow delay of the tool feed, in connection with various rotational speeds of the main spindle. Control mean of the numerically controlled machine tool serve to search the compensation data according to the rotational speed of the main spindle during machining operation. Then, the control means compensate the profile data with the searched compensation data in order to eliminate follow errors, which change depending upon the rotational speed of the main spindle.

According to another aspect of the invention, the compensation values are stored in the compensation data memory means in connection with various types of cam and various rotational speeds of the main spindle. The control means search the compensation data according to the type of cam to be machined and the rotational speed of the main spindle during machining operation. Accordingly, follow errors are eliminated regardless of the type of the cam and the rotational speed of the main spindle.

According to another aspect of the invention, the compensation data is composed of phase compensation value and position compensation data. The position compensation data is composed of a series of position compensation values for successive rotational positions of the main spindle. The control means offset the read out position of the profile data according to the phase compensation value, and compensate the profile data with the series of position compensation values.

BRIEF DESCRIPTION OF THE DRAWINGS

Various other objects, features and attendant advantages of the present invention will readily be appreciated as the same becomes better understood by reference to the following detailed description of a preferred embodiment when considered in correction with the accompanying drawings, in which:

FIG. 6 shows a compensation value table stored in the compensation value memory area shown in FIG. 4;

FIG. 7 is a flow chart explaining the operation of the main CPU shown in FIG. 3 for inputting compensation data;

DESCRIPTION OF THE PREFERRED EMBODIMENT

Figure 1:
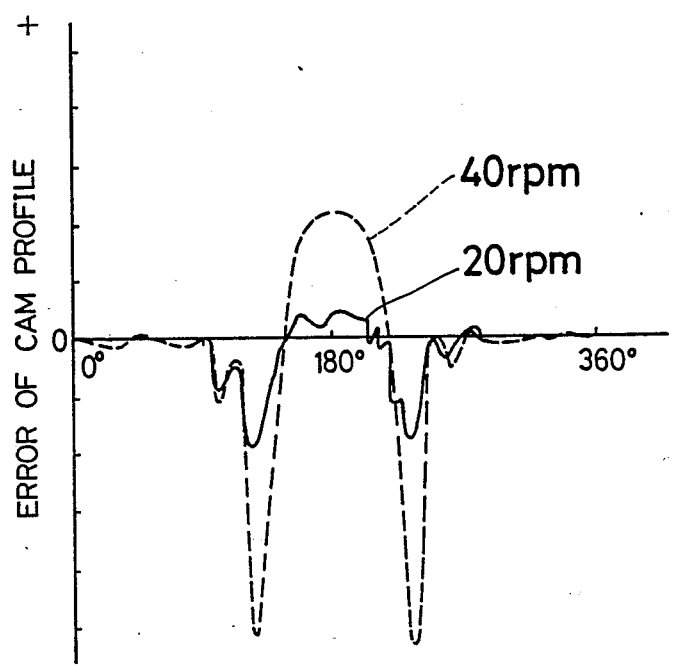
FIG. 1 is a chart which illustrates the measured error.
Figure 2:
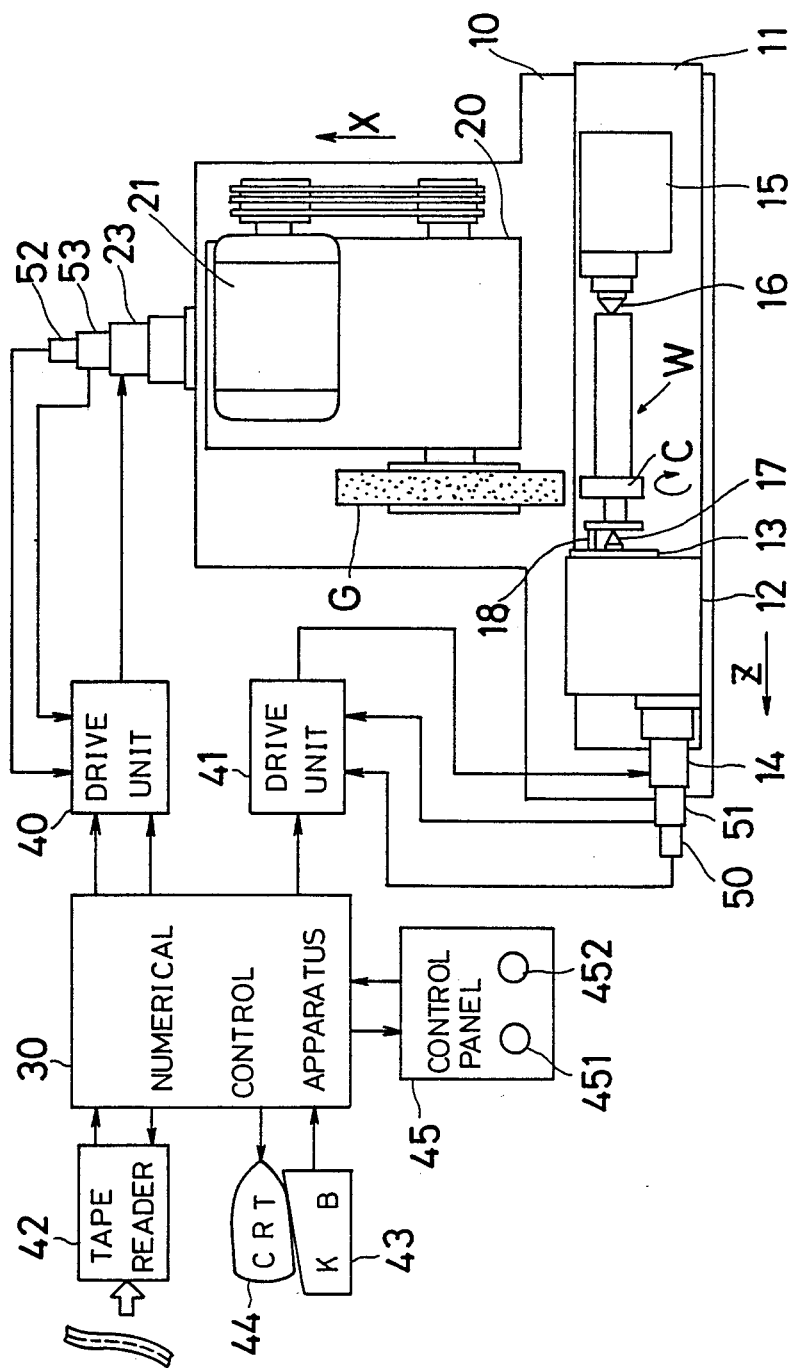
FIG. 2 is a schematic view of a numerically controlled machine tool according to the present invention.

Referring now to the drawings and particularly to FIG. 2 thereof, a numerically controlled grinding machine is shown comprising a bed 10, on which a table 11 is slidably guided along a Z axis which is parallel to a main spindle 13. A workhead 12 is mounted on the left-hand end of the table 11. The workhead 12 has rotatably carried therein the main spindle 13, which is connected to a servomotor 14 so as to be rotated thereby. A tail stock 15 is also mounted on the right-hand end of the table 11. A workpiece W having a cam C is carried between the center 17 of the main spindle 13 and the center 16 of the tail stock 15. The left end of the workpiece is engaged with a positioning pin 18, which is fixed on the main spindle 13, so as to synchronize the phase of the workpiece W with the phase of the main spindle 13.

A tool slide 20 is slidably guided on a rear portion of the bed for movement toward and away from the workpiece W along an X axis. A grinding wheel 22, rotatably supported as a tool on the tool slide 20, is rotated by a motor 21. The tool slide 20 is connected to a servomotor 23 through a feed screw (not shown) so that advancing and retraction movement of the tool slide 20 is effected by the servomotor 23.

As indicated in FIG. 13, drive units 40, 41 are circuits to drive servomotor 23, 14, respectively, in response to command pulses, which are generated by the numerical controller 30.

Pulse generators 50, 52 and tachogenerators 51, 53 are connected to the servomotor 14, 23, reselectively, and output signals from the pulse generators 50, 52 and the tachogenerators 51, 53 are fed back to the drive units 40, 41 in order to control the servomotor 14, 23 with the velocity feed back signal and the position feed back signal.

The numerical controller 30 controls the rotation of the servomotor 23, 14 numerically so as to grind the workpiece W. A tape reader 42 for inputting ideal profile data and machining cycle data, a keyboard 43 for inputting control data, a CRT display device 44 for displaying various information and a control panel 45 for inputting an operator command are connected to the numerical controller 30.

Figure 3:
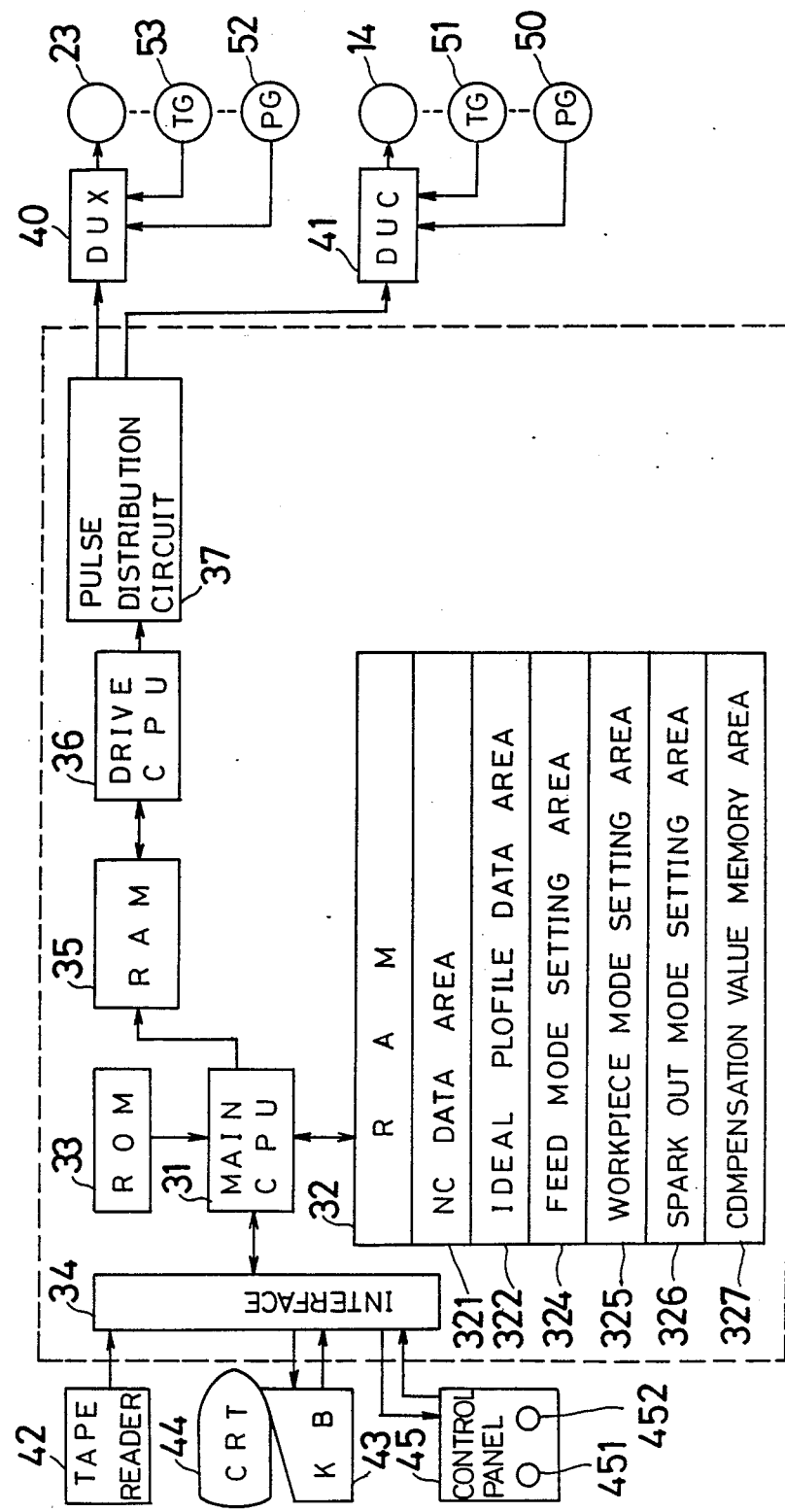
FIG. 3 is a block diagram showing the structure of the numerical controller shown in FIG. 2.

The numerical controller 30 comprises a main central processing unit (hereinafter referred to a "main CPU") 31, a read only memory (ROM) 33, in which control program is stored, a random access memory (RAM) 32 and an interface 34 as shown in FIG. 3. In the RAM 32, there is an NC data area 321 for storing numerical control programs, an ideal profile data area 322 for storing ideal profile data calculated from the ideal final shape of the workpiece, a compensation value memory area for storing phase compensation values and position compensation values of tool feed axis (X axis). The RAM 32 also has a feed mode setting area 324, a workpiece mode setting area 325, a spark-out mode setting area 326, and a phase error compensation mode setting area 327.

Figures 4, 5:
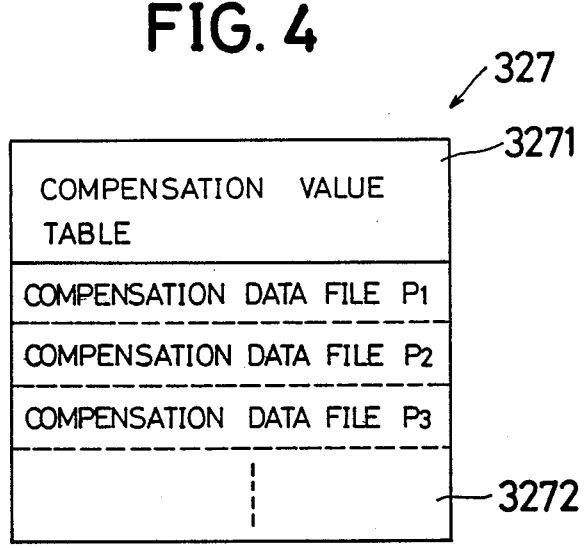
FIG. 4 shows a compensation value table and compensation data files formed in the compensation value memory area shown in FIG. 3.
FIG. 5 shows X axis compensation values stored in compensation data files shown in FIG. 4.

The compensation value memory area is composed of a compensation value table 3271 and compensation data file area 3272 as shown in FIG. 4. The compensation value table 3271 stores phase compensation values and the file numbers of X axis position compensation data files in connection with various rotation speeds of the main spindle 13 and ideal profile data numbers as shown in FIG. 6.

Each X axis compensation data file stores a series of X axis (position) compensation values in connection with the rotational positions of the main spindle 13 as shown in FIG. 5.

The numerical controller 30 also comprises a drive CPU 36, a RAM 35 and a pulse distribution circuit 37 so as to distribute command pulses to drive units 40, 41. The RAM 35 stores positioning data sent from main CPU 31. The drive CPU 36 executes calculations for slow up, slow down and interpolation depend on the positioning data sent from the main CPU 31 via the RAM 35, and outputs the amount of movement data and velocity data at a predetermined interval. The pulse distribution circuit 37 distributes feed command pulses to drive units 40, 41 according to the amount of movement data and velocity data.

Figures 10, 11:
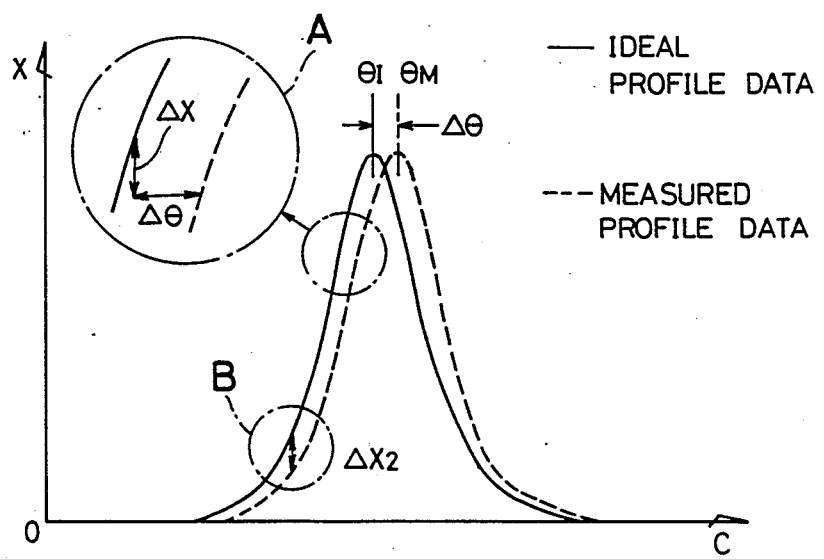
FIG. 10 shows a numerical control program for machining a workpiece.
FIG. 11 is an explanatory chart which explains the method of obtaining compensation values.

The process for storing the compensation data will be described below. The compensation data can be obtained by a method described below. At first, a workpiece is machined according to the ideal profile data, and the cam profile of the machined workpiece is measured to obtain measured profile data. Then, the compensation data is calculated depending upon the difference between the ideal profile data and measured profile data. Namely, the phase compensation value $\Delta\theta$ is calculated depending upon the angle difference between the angle position $\theta_I$ of C axis, whereat the X axis position of the ideal profile data reaches the maximum value, and the angle position $\theta_M$ of C axis, whereat the X axis position of the measured profile data reaches the maximum value, as shown in FIG. 11. Position compensation values $\Delta X(I)$ in the X axis (hereafter referred to "X axis compensation values") are calculated depending on the difference in X axis between the ideal profile data and shifted measured profile data, which is obtained by shifting the measured profile data by the phase compensation value $\Delta\theta$.

The compensation data can be also obtained by a method described in U.S. Patent Application Ser. No 07/092,689. In this method, the machine is operated according to the ideal profile data, and the positional changes of the main spindle 13 and the tool slide 20 are measured during the operation in order to obtain measured profile data. Then, the compensation data is calculated based on the ideal profile data and the measured profile data.

The compensation data is obtained for various rational speeds of the main spindle. Then, the compensation data is recorded on an NC tape in connection with the profile data number of the cam and the rotational speed of the main spindle. When the switch 451 on the control panel 45 is pushed by an operator after the above described preparation, the main CPU 31 executes the compensation data read-in program shown in FIG. 7.

At first, a profile data number is input via the tape reader 42 at step 400 and is stored in the compensation value table 3271 at step 402.

At step 404, a variable n designating the column number of the compensation value table 3271 is initially set at 1. Then, a rotational speed Rn of the main spindle 14 and a phase compensation value Qn are input via the tape reader 42 at steps 406 and 408. After that, a series of X axis compensation values $\Delta X$ (I) and a compensation data file number Pn, which designates a data file where the X axis compensation values are to be stored, are input at step 410. At step 412, the rotational speed Rn, the phase compensation value Qn and the compensation data file number Pn are stored in the column n of the compensation value table 3271, and the series of X axis compensation values ΔX (I) are stored in the compensation data file Pn.

Thereafter, the process of the main CPU 31 moves to step 414 for ascertaining whether or not all compensation data for a certain profile is stored. If it is not completed, the process moves to step 416 in to add 1 to the variable n, and then moves back to step 406 so as to input compensation data which will be stored in the next column and the next data file. By repeating the above mentioned process, compensation data for various rotational speeds (10 rpm, 20 rpm, 30 rpm) are stored in the compensation value table 3271 and compensation data files in connection with the profile data number and the rotational speed of the main spindle.

Thereafter, when the switch 452 on the control panel 45 is pushed, an NC program for a machining cycle stored in the RAM 32 is executed. The NC program is shown in FIG. 10. NC data in the NC program is decoded by the main CPU 31 according to steps as specified by the flow chart shown in FIG. 8(a) and 8(b).

One block of an NC program is read out from the NC program area of the RAM 32 at step 100, and it is ascertained whether or not the data of the block shows the end of the program at step 102. If the data shows completion of the NC program, the execution of this program is ended. But if not, the process of main CPU 31 moves to step 104, and it is ascertained whether or not the block includes code G at step 104. If code G is ascertained at step 104, the process of main CPU 31 moves to step 106 so as to ascertain the command code in greater detail. In step 106 through step 116, mode flags in the mode setting area 324 ~ 326 of the RAM 32 are set, depending on the detail command code. If code G01 is ascertained at step 106, the flag in the feed mode setting area 324 is set at step 108 so as to set a feed mode in a grinding feed mode. Similarly, if code G04 is ascertained at step 110, the flag in the spark out mode setting area 326 is set at step 112 so as to set the feed mode in a spark-out mode. If code G51 is ascertained at step 114, the flag in the workpiece mode setting area 325 is reset to set the workpiece mode in a cam mode at step 116.

Furthermore, if code x is ascertained at step 118, the process of the main CPU 31 moves to step 120, and it is ascertained whether or not the workpiece mode is set in the cam mode and the feed mode is set in the grinding feed mode (hereafter referred to as the cam grinding mode). If the mode is the cam grinding mode, pulse distribution for grinding the cam is executed at step 128. If not, a regular pulse distribution, which is not synchronized with main spindle rotation, is executed at step 122.

On the other hand, if code x is not ascertained at step 118, it is ascertained whether or not the spark out process is commanded at step 124. If the spark out process is commanded, the process of the main CPU 31 moves to step 126 in order to execute pulse distribution for spark-out grinding.

The process for actual cam grinding with compensation will be explained according to the NC program shown in FIG. 10.

Figure 8A:
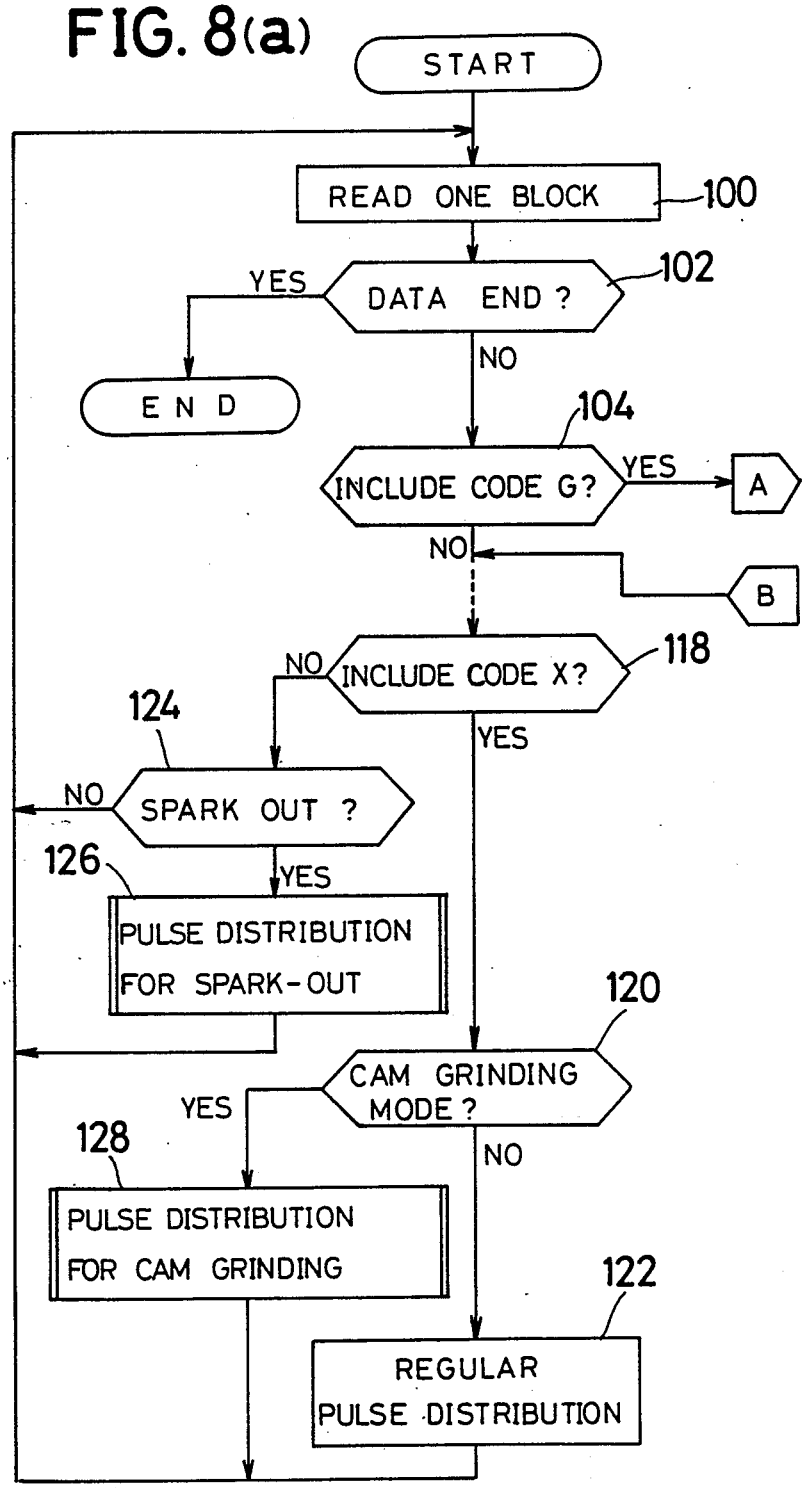
FIGS. 8(a) and 8(b) are flow charts explaining the general operation of the main CPU shown in FIG. 3 for the machining process.
Figure 8B:
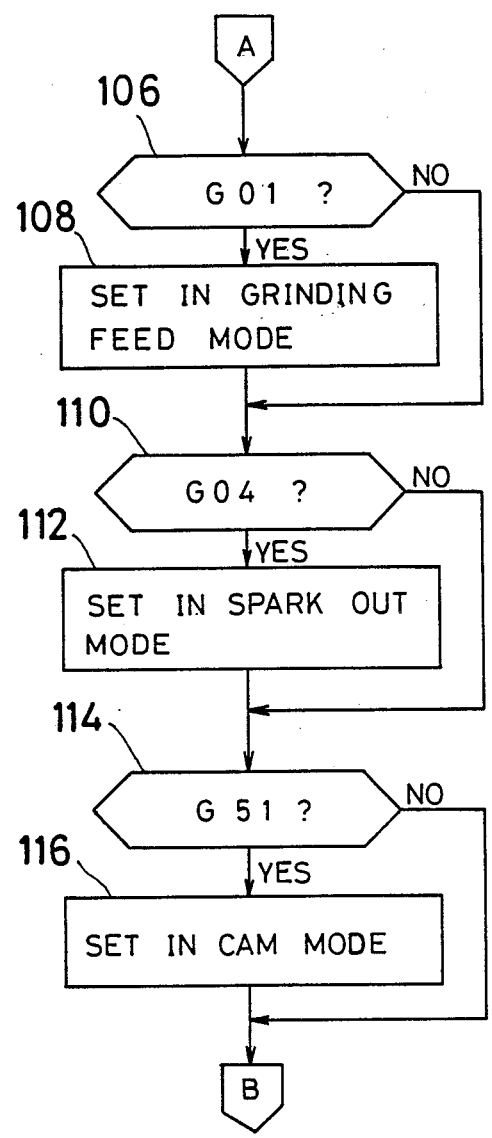

When the switch 452 on the control panel 45 is pushed, the NC program for the machining cycle shown in FIG. 10 is decoded block by block according to the process shown in FIG. 8(a) and FIG. 8(b). First, in response to code G51 in block N010, the workpiece mode is set in a cam mode, and one set of the ideal profile data designated by profile number P1234 is selected at step 116. Then the feed mode is set in a grinding feed mode in response to the code 601 in block N020 at step 108, and the cam grinding procedure is executed at step 128 in response to feed data X-0.1. Data with code F in block N020 indicates the feed amount per revolution of the main spindle 13, and data with code R indicates the feed speed per revolution of the main spindle 13. Data with code S indicates the rotational speed of the main spindle 13. Since data with code F and data with code R are the safe value in the NC program shown in FIG. 10, the grinding wheel G is fed continuously at a constant speed until the total cut-in feed amount reaches a programmed total feed value with code X.

Figure 9A:
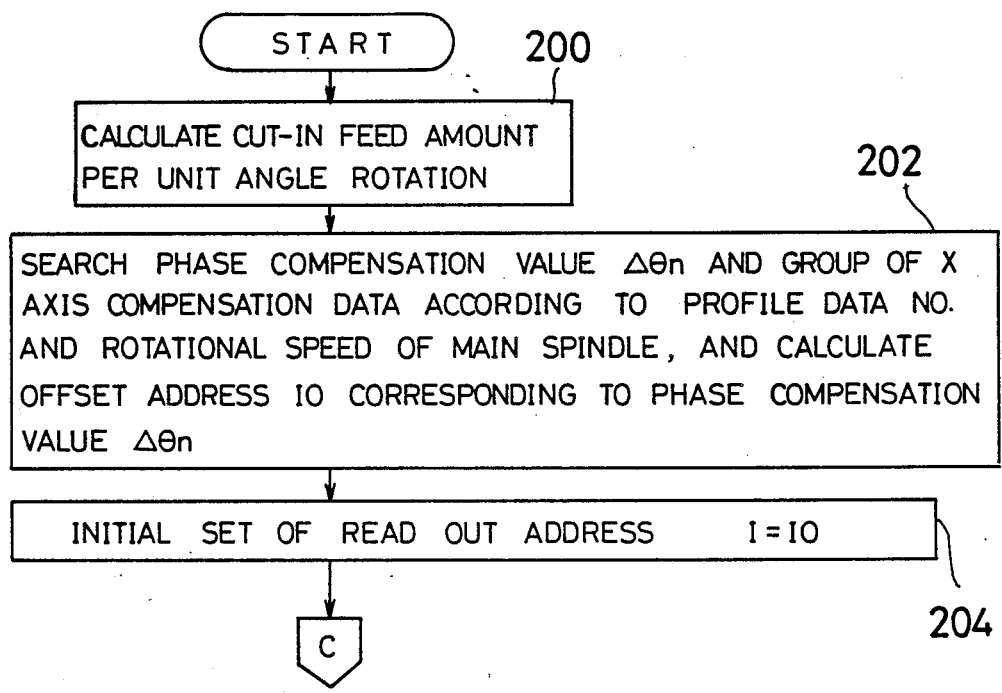
FIGS. 9(a) and 9(b) are flow charts for illustrating the details of a step shown in FIG. 8(a)
Figure 9B:
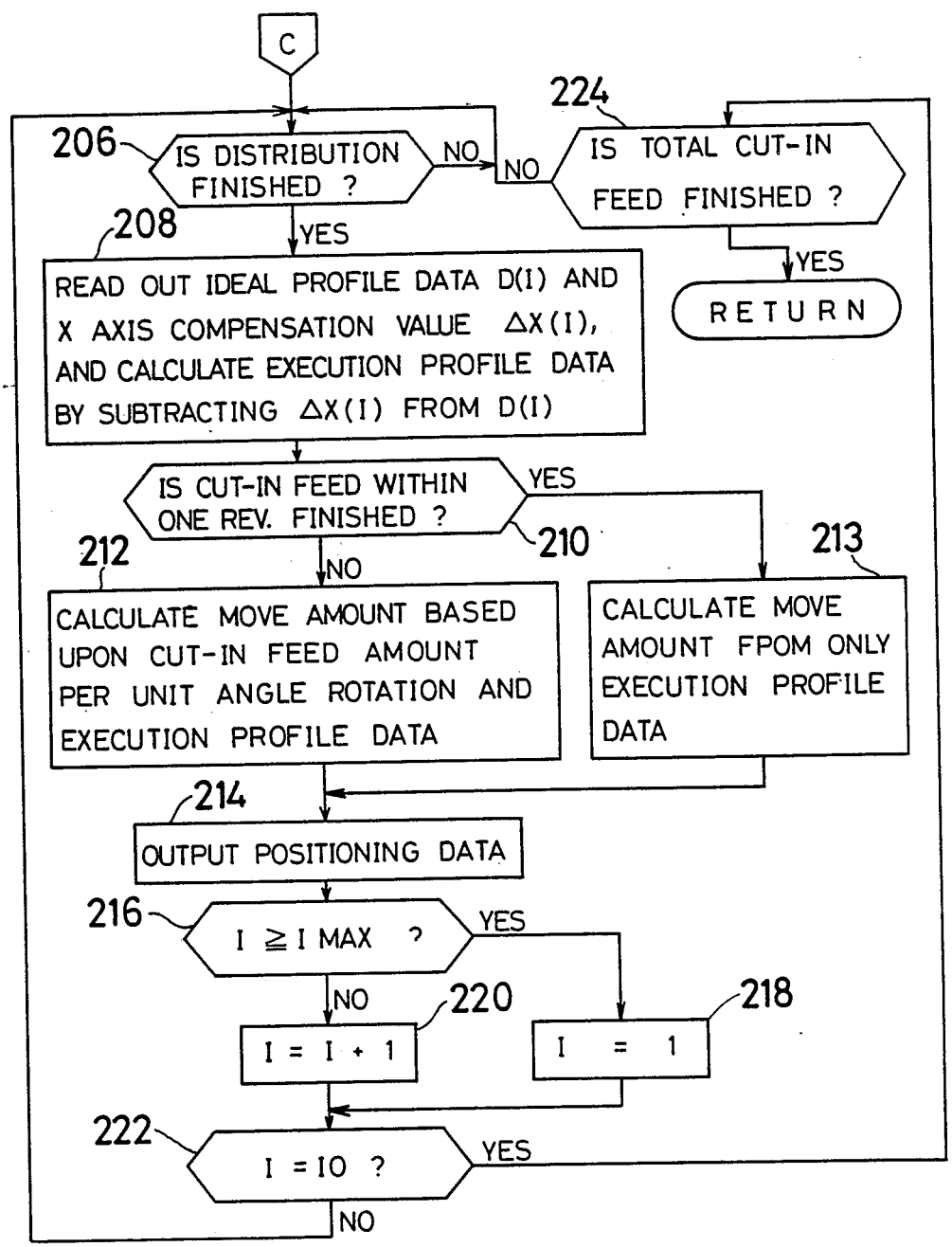

The cam grinding operation with compensation is accomplished by the process at step 128. The details of the process at step 128 are shown in FIG. 9(a) and 9(b). First, the pulse number corresponding to the cut-in feed amount per unit rotational angle (0.5°) is calculated depending upon the data with code R at step 200. Then, a phase compensation value $\Delta\theta$ and compensation data file number P are searched from the compensation value table 3271 according to the commanded profile data number and the commanded rotational speed of the main spindle, and compensation data file designated by the compensation data file number P is searched from the data file area 3272, at step 202. The compensation data file stores a series of X axis compensation values $\Delta X$ (I) for successive rotational angle positions of the main spindle 13, wherein each rotational position is located at intervals of 0.5 degrees.

The phase error can be compensated for by offsetting the read out position of the execution profile data ahead from a theoretical read out position, which corresponds to the commanded angle position of the main spindle, by an amount corresponding to the phase compensation value $\Delta\theta$. At step 202, the offset address IO corresponding to the phase compensation value $\Delta\theta$ is also calculated. Then, read out address I is initially set to the offset address IO at step 204. The read out address I is used for designating the read out positions of ideal profile data and the X axis compensation values.

Afterwards, the pulse distribution finish signal is input at step 206 so as to ascertain whether or rot the previous pulse distribution is finished. If the previous pulse distribution is finished, the execution profile data D(I) and X axis compensation value $\Delta X$ (I) are read out, and then execution profile data A (I) is calculated with the equation described below.

$A(I) = D(I) - \Delta X(I)$

Thereafter, it is ascertained whether or not the cut-in feed within one revolution is finished or completed at step 210. This is ascertained depending on the data with code F. In this case, it is ascertained whether or not the cut-in feed is finished by ascertaining whether or not the feed amount within one revolution reaches 0.1 mm. If the cut-in feed within one revolution is not finished, the amount of movement data is calculated based upon the cut-in amount per unit angle and execution profile data A (I) at step 212. Then, the positioning data is output to the drive CPU 36 at step 214. On the other hand, if the cut-in feed within one revolution is finished, the moving amount is calculated from only the execution profile data A (I) at step 213.

Then, it is ascertained whether or not read out address I reaches the final address $I_{max}$ of the profile data at step 216. If I is equal to or larger than $I_{max}$ the read out address I is reset to an initial value 1 at step 218 so as to return the read out address to the beginning address. If not, the read out address I is incremented by 1 at step 220. Then, it is ascertained whether or not read out address I reaches the offset address IO so as to detect one revolution of the main spindle 13. If read out address I reaches the offset address IO, it is ascertained whether or not the total cut-in feed amount reaches a programmed total feed amount, which is programmed with code X. If the total cut-in feed amount does not reach the programmed amount, the process moves to step 206 so as to continue the above-mentioned process repeatedly. If the total cut-in feed amount reaches the programmed amount, the process for grinding the cam according to the NC program in block 20 is finished.

Furthermore, the process for spark-out grinding is executed in response to code G04 in block N030. This process is similar to the process shown in FIG. 9(a) and 9(b). However, there is no cut-in feed in this process and spark-out grinding is finished when the number of revolutions of the main spindle 13 reaches a programmed value. Namely, a phase compensation value $\Delta\theta$ and a series of X axis compensation value $\Delta X$ (I) are searched according to the profile data number and rotational speed of the main spindle during sparkout grinding. Then, ideal profile data, which are offset by the phase compensation value $\Delta\theta$ from the commanded angle position of the main spindle, are read out successively, and is compensated by X axis compensation value $\Delta X$ (I). The compensated ideal data is output successively during the programmed rotation of the workpiece so that the spark-out grinding is accomplished with compensation for the errors, which changes depend upon the speed of the main spindle.

Obviously, numerous modifications and variations of the present invention are possible in light of the above teachings. It is therefore to be understood that within the scope of the appended claims, the invention may be practiced than as specifically described herein.

What is claimed as new and desired to be secured by Letters Patent of the United States is:

1. A numerically controlled machine tool for machining a non-circular workpiece by controlling numerically the main spindle rotation and the position of the tool according to profile data which defines the profile generating movement of a tool along a final shape of said workpiece, said numerically controlled machine tool comprising:
   profile data memory means for storing profile data which is calculated form an ideal sectional shape of said workpiece and indicates positional change of said tool with respect to the rotational position of said workpiece;
   numerical control data memory means for storing numerical control data which commands to perform at least two successive machining steps in which the position of said tool is controlled in accordance with said profile data, and commands the rotational speed of said main spindle to be changed at each machining step;
   compensation data memory means for storing at least two groups of compensation data which are used for compensating for follow delay of the tool feed, in connection with the rotational speeds of said main spindle at said at least two machining steps; and
   control means operable in response to said numerical control data for searching one group of said compensation data corresponding to the commanded rotational speed of said main spindle during said each machining step from said compensation data memory means, and for compensating said profile data with said searched group of compensation data so as to control the position of said tool while eliminating said follow delay.

2. A numerical controlled machine tool as set forth in claim 1, wherein:
   said compensation data memory means comprise a phase compensation values memory area for storing plural phase compensation values corresponding with various rotational speeds of said main spindle and a position compensation data memory area for storing plural position compensation data corresponding with said various rotational speeds of said main spindle, wherein said each position compensation data is composed of a series of position compensation values of said tool feed for successive rotational positions of said main spindle; and said control means comprises means for searching said phase compensation value and position compensation data from said phase compensation value memory area and position compensation data memory area, respectively, according to the rotational speed of said main spindle during machining operation, and compensate said profile data with said searched phase compensation value and position compensation data so as to control said tool feed.

3. A numerically controlled machine tool for machining a non-circulator workpiece by controlling numerically the main spindle rotation and the position of the tool according to profile data which defines the profile generating movement of a tool along a final shape of said workpiece, said numerically controlled machine tool comprising:
   profile data memory means for storing profile data which is calculated from an ideal sectional shape of said workpiece and indicates positional change of said tool with respect to the rotational position of said workpiece;
   numerical control data memory means for storing numerical control data which commands to perform at least two successive machining steps in which the position of said tool is controlled in accordance with said profile data, and commands the rotational speed of said main spindle to be changed at each machining step;
   compensation data memory means for storing at least two groups of compensation data which are used for compensating for follow delay of the tool feed, corresponding with various types of said workpiece and the commanded rotational speeds of said main spindle at said at least two machining steps; and
   control means operable in response to said numerical control dates for search one group of said compensation data corresponding to the type of workpiece to be machined and the commanded rotational speed of said main spindle during said each machining step from said compensation data memory mean, and for compensating said profile data with said searched group of compensation data so as to control the position of said tool while eliminating said follow delay.

4. A numerical controlled machine tool as set forth in claim 1, wherein:

said compensation data memory means comprise a phase compensation values memory area for storing plural phase compensation values corresponding with various types of said workpiece and various rotational speeds of said main spindle and a position compensation data memory area for storing plural position compensation data corresponding with said various types of said workpiece and various rotational speeds of said main spindle, wherein said each position compensation data comprises a series of position compensation values of said tool feed for successive rotational positions of said main spindle; and said control means includes means for searching said phase compensation value and position compensation data from said phase compensation value memory area and position compensation data memory area, respectively, according to the type of workpiece to be machined and the rotational speed of said main spindle during machining operation, and compensate said profile data with said read out phase compensation value and position compensation data so as to control said tool feed.

5. A numerical controlled machine tool as set forth in claim 4, wherein:

said profile data memory means comprises means for storing a series of positional data of said tool in a successive memory address;

said position compensation data memory area comprises means for storing a series of compensation values in successive memory address; and said control means comprises means for offsetting the read out position of said profile data and compensation values from a theoretical memory address by an amount corresponding to said searched phase compensation value, for reading out said positional data and position compensation values successively from an offset memory address, and compensating said read out positional data with read out position compensation values.

* * * * *